US010391600B2

United States Patent
Zak et al.

(10) Patent No.: US 10,391,600 B2
(45) Date of Patent: Aug. 27, 2019

(54) FLEXIBLE FIXTURING

(71) Applicants: MAGNA INTERNATIONAL INC., Aurora, Ontario (CA); Alexander Zak, Troy, MI (US); Frank Gabbianelli, Birmingham, MI (US); Rajesh Angadi, Troy, MI (US)

(72) Inventors: Alexander Zak, Troy, MI (US); Frank Gabbianelli, Birmingham, MI (US); Rajesh Angadi, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 11 days.

(21) Appl. No.: 15/567,453

(22) PCT Filed: Apr. 29, 2016

(86) PCT No.: PCT/US2016/029946
§ 371 (c)(1),
(2) Date: Oct. 18, 2017

(87) PCT Pub. No.: WO2016/176524
PCT Pub. Date: Nov. 3, 2016

(65) Prior Publication Data
US 2018/0111239 A1    Apr. 26, 2018

Related U.S. Application Data

(60) Provisional application No. 62/154,349, filed on Apr. 29, 2015.

(51) Int. Cl.
*B23Q 7/18* (2006.01)
*B23Q 15/22* (2006.01)
(Continued)

(52) U.S. Cl.
CPC ............ *B23Q 15/22* (2013.01); *B23Q 7/18* (2013.01); *B65G 47/24* (2013.01); *G05B 11/011* (2013.01); *G05B 2219/37555* (2013.01)

(58) Field of Classification Search
CPC ............ B23Q 15/22; B23Q 7/18; B65G 47/24
(Continued)

(56) References Cited

U.S. PATENT DOCUMENTS 5,364,083 A * 11/1994 Ross ............... B23Q 1/035
269/21
6,162,008 A * 12/2000 Perkins ............ G01B 11/24
198/394

(Continued)

FOREIGN PATENT DOCUMENTS

DE    102009049239 A1    8/2011

OTHER PUBLICATIONS

International Search Report; Appl. No. 167871995; dated Nov. 16, 2018; 16 pages.

*Primary Examiner* — Douglas A Hess
(74) *Attorney, Agent, or Firm* — Dickinson Wright PLLC

(57) ABSTRACT

A system and method for orienting a workpiece on an assembly line to prepare the workpiece for an operation is provided. The method includes positioning a flexible fixture on the assembly line. The flexible fixture has a base and at least one adjustable component. The workpiece is positioned on the flexible fixture. A first orientation of the workpiece relative to the flexible fixture is detected with a detection device and transmitted to a calibrator. The calibrator determines a difference between the detected first orientation of the workpiece and a predetermined fixture orientation and transmits instructions from the calibrator to the flexible fixture to move the workpiece from the detected first orientation to the predetermined fixture orientation. The workpiece is moved with the at least one adjustable component (Continued)

into the predetermined fixture orientation and is fixedly held with the adjustable component.

20 Claims, 6 Drawing Sheets

(51) Int. Cl.
*B65G 47/24* (2006.01)
*G05B 11/01* (2006.01)

(58) Field of Classification Search
USPC ............... 198/345.1, 502.2, 502.3; 269/266; 248/206.3, 363
See application file for complete search history.

(56) References Cited

U.S. PATENT DOCUMENTS

| | | | | |
|---|---|---|---|---|
| 6,250,619 B1* | 6/2001 | Cook | ............ | B23Q 1/035 269/20 |
| 6,386,805 B1* | 5/2002 | Suzuki | ............ | B23Q 1/035 269/21 |
| 6,601,313 B2* | 8/2003 | Shin | ............ | H01L 21/67259 33/645 |
| 6,607,336 B1* | 8/2003 | Suzuki | ............ | B23Q 1/032 269/21 |
| 6,764,434 B1* | 7/2004 | Volk | ............ | B23Q 1/032 144/48.1 |
| 6,769,969 B1* | 8/2004 | Duescher | ............ | B24B 1/00 451/287 |
| 7,042,568 B2* | 5/2006 | Mayo | ............ | H01L 21/681 250/559.29 |
| 7,458,762 B2* | 12/2008 | Han | ............ | H01L 21/67098 414/781 |
| 7,857,021 B2 | 12/2010 | Boyd et al. | | |
| 8,322,700 B2* | 12/2012 | Saberton | ............ | B23Q 1/035 269/296 |
| 8,534,659 B2* | 9/2013 | Tung | ............ | C23C 14/50 269/21 |
| 8,614,797 B2* | 12/2013 | Hellwig | ............ | H01L 21/681 356/614 |
| 9,496,160 B2* | 11/2016 | Hankes | ............ | H01L 21/67201 |
| 2006/0039769 A1 | 2/2006 | Newman | | |
| 2008/0127474 A1 | 6/2008 | McAllister | | |
| 2013/0127105 A1 | 5/2013 | Saberton et al. | | |
| 2015/0056043 A1 | 2/2015 | Hankes | | |

* cited by examiner

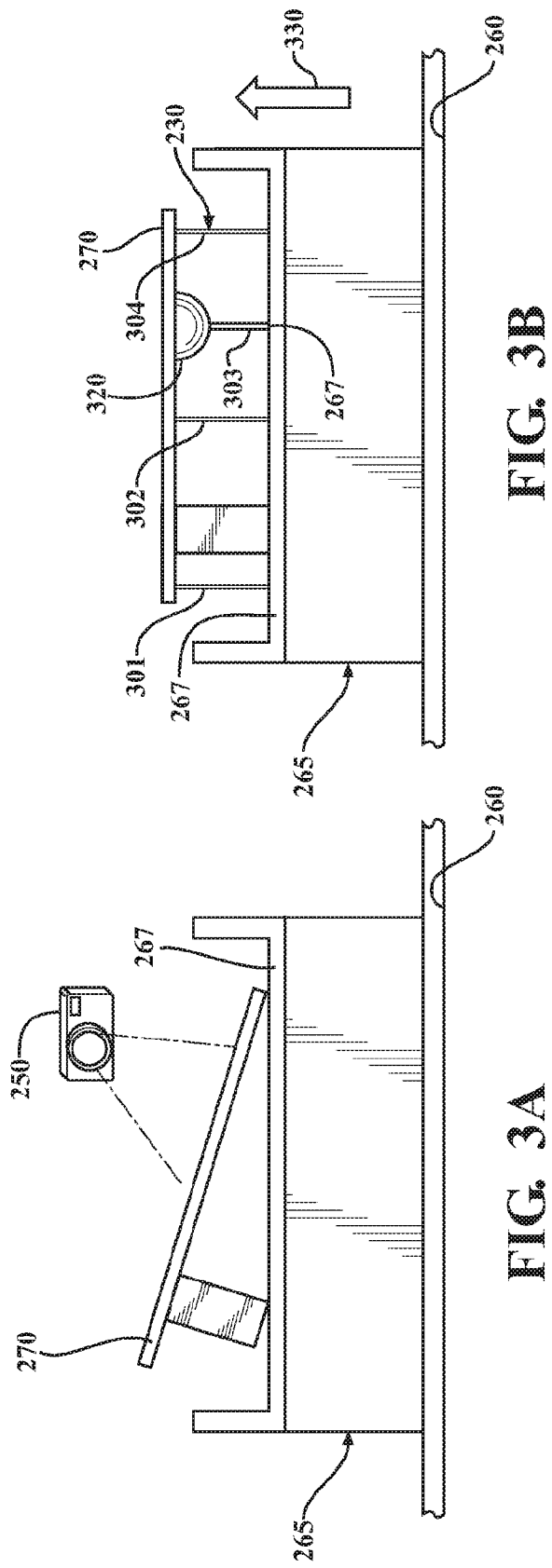

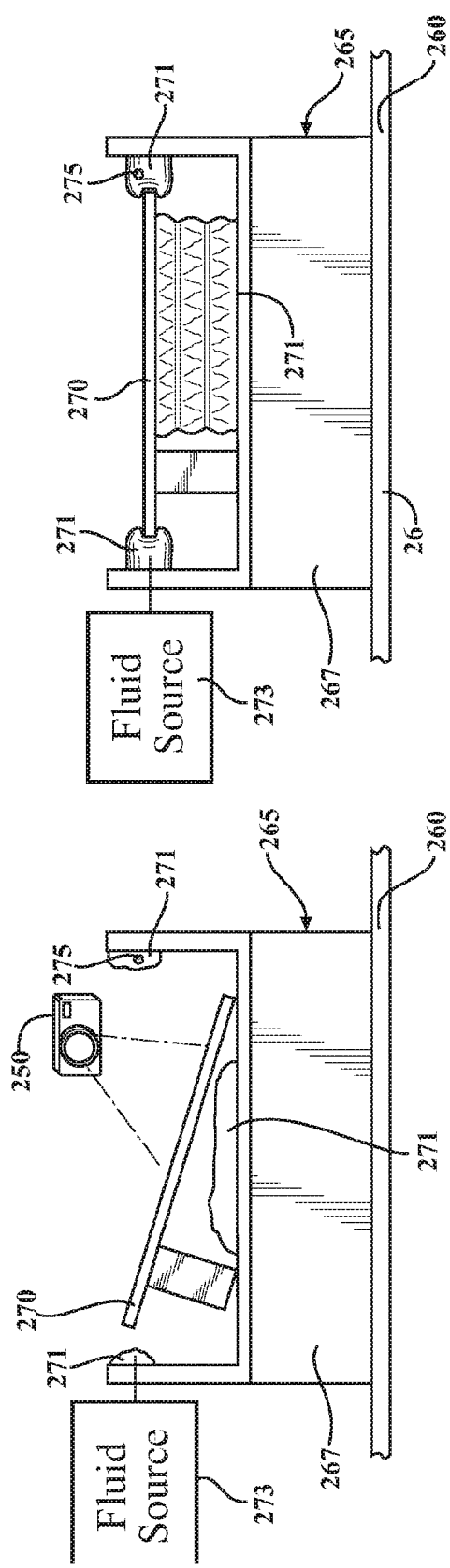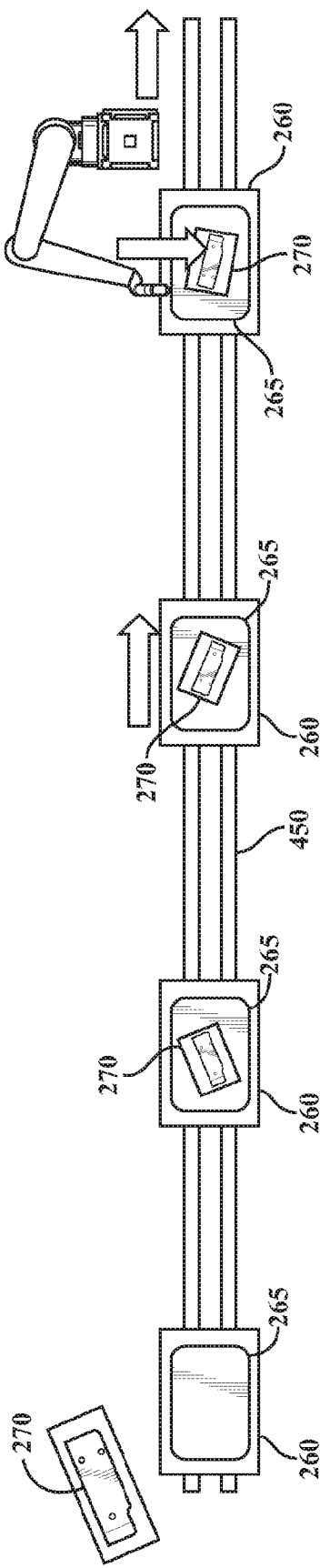

FLEXIBLE FIXTURING

CROSS REFERENCE TO RELATED APPLICATIONS

This U.S. National Stage Patent Application claims the benefit of PCT International Patent Application Serial No. PCT/US2016/029946 filed Apr. 29, 2016 entitled "Flexible Fixturing" which claims the benefit of U.S. Provisional Patent Application Ser. No. 62/154,349 filed on Apr. 29, 2015 entitled "Flexible Fixturing," the entire disclosures of the applications being considered part of the disclosure of this application and hereby incorporated by reference.

BACKGROUND

Assembly processes (or lines) are implemented to produce a finished good. The finished goods are a combination of various parts that are attached together through various techniques. A finished good may be any sort of object or product, for example, those sold in commerce. An automobile or vehicle, or a part of an automobile or vehicle, may be a finished good produced via an assembly process.

The parts may connect to each through various workpieces. A workpiece is an assembly part, e.g., a housing, that facilitates in the attachment of different configurable goods and products employed in a finished good. The workpieces are attached to each other to produce a finished good.

In the assembly line, different stations are set up to perform different operations in the creation of a finished good. Each station may serve to incrementally aid in the creation of the finished good.

In order to facilitate the attachment of the workpiece in a manner to produce a finished good, the workpieces are placed in fixtures. A fixture is a mounting element that allows the workpiece to be operated on, and affixed to other parts. The fixture might be a clamp, a vice, a fastening technique, and the like.

The current technique involves receiving a workpiece, manually determining a fixture, and finding the specific fixture for the received workpiece. In modern assembly lines, the assembly line may be tasked to produce many different finished goods. For example, the same assembly line may be responsible for assembling multiple vehicles or parts. Further, the same finished good may involve numerous workpieces.

Thus, many permutations and combinations may be employed in the production of a finished good, or the same assembly line may be employed to produce multiple finished goods. As such, many different workpieces may be implemented.

In this way, every time a new workpiece enters a station, a manual process of determining a fixture may occur. This manual process may introduce delays and inefficiencies to the overall assembly line process.

SUMMARY

A method for orienting a workpiece on an assembly line to prepare the workpiece for an operation is provided. The method includes positioning a flexible fixture on the assembly line, wherein the flexible fixture has a base and at least one adjustable component being moveable relative to the base; positioning a workpiece on the flexible fixture; detecting a first orientation of the workpiece relative to the flexible fixture with a detection device and transmitting the detected first orientation from the detection device to a calibrator; determining a difference between the detected first orientation of the workpiece and a predetermined fixture orientation with the calibrator and transmitting instructions from the calibrator to the flexible fixture to move the workpiece from the detected first orientation to the predetermined fixture orientation with the at least one adjustable component of the flexible fixture based on the determined difference; and moving the workpiece with the at least one adjustable component into the predetermined fixture orientation and fixedly holding the workpiece in the predetermined fixture orientation with the adjustable component.

A system for orienting a workpiece on an assembly line to prepare the workpiece for an operation is also provided. The system includes a flexible fixture having at least one base and at least one adjustable component being moveable relative to the base for being disposed on the assembly line and for supporting the workpiece as the flexible fixture moves along the assembly line; a detection device for detecting a first orientation of the workpiece relative to the flexible fixture; and a calibrator electrically connected to the flexible fixture and the detection device and configured to transmit instructions to the flexible fixture to move the workpiece from the detected first orientation to a predetermined fixture orientation with the at least one adjustable component of the flexible fixture and to hold the workpiece in the predetermined fixture orientation with the adjustable component.

Employing the aspects disclosed herein, an assembly line to produce finished goods may robustly handle multiple finished goods with different workpiece types. The flexible fixtures disclosed herein allow for a variety of workpiece types to be included in the same assembly line. Further, due to the automated nature of the methods discussed herein, gains in efficiency and resource reduction are achieved.

DESCRIPTION OF THE DRAWINGS

The detailed description refers to the following drawings, in which like numerals refer to like items, and in which:

FIGS. 3A, 3B and 3C illustrate an example of a flexible fixture;

FIGS. 4A and 4B illustrate a further example of a flexible fixture;

FIG. 5 illustrates an example of a an assembly line on which an example of a flexible fixture may be utilized.

DETAILED DESCRIPTION OF THE EXAMPLE EMBODIMENTS

Figure 1:
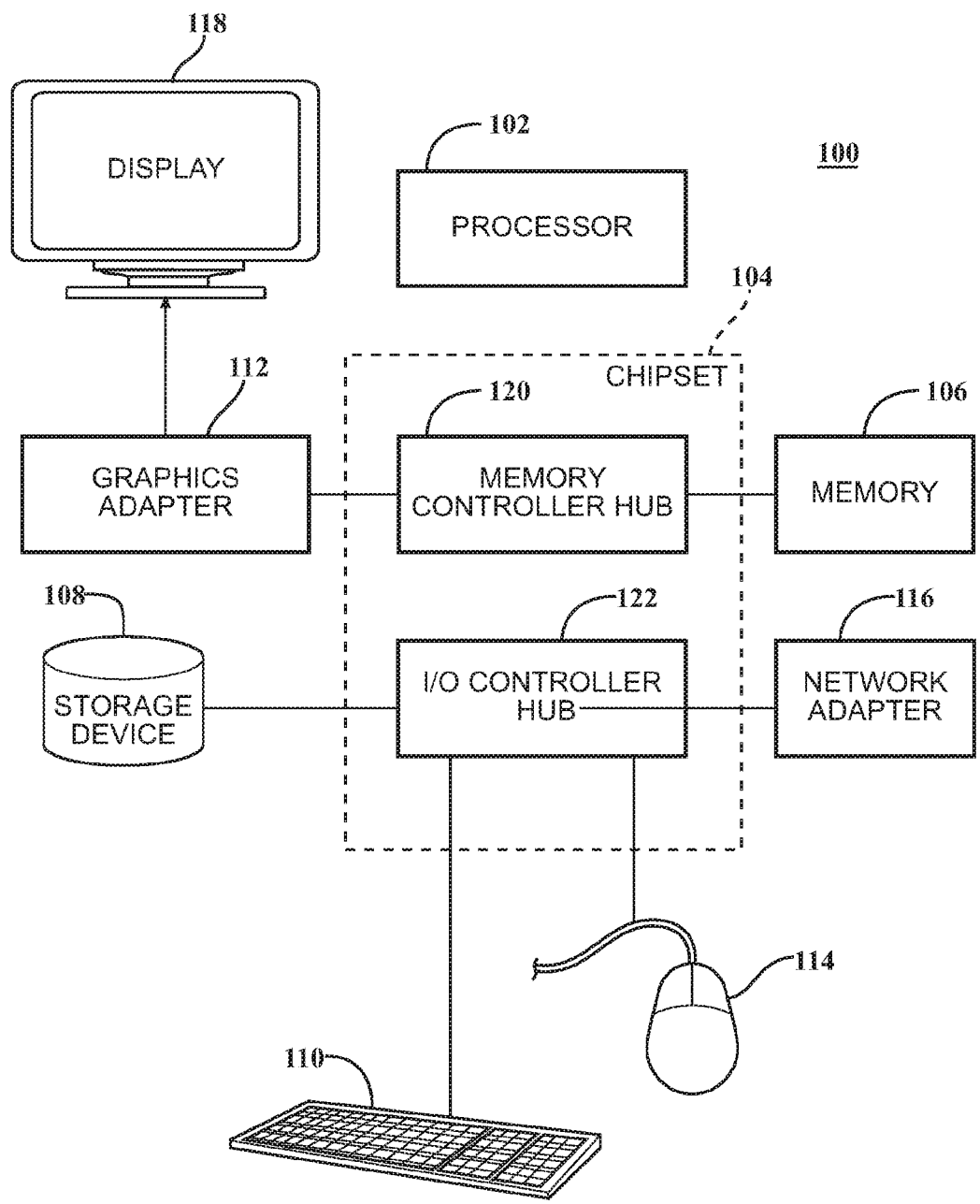
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

It should be appreciated that the term "workpiece" as discussed throughout the subject disclosure, including the claims, may encompass various types of workpieces including, but not limited to, various types of housings.

Assembly lines aid in the production of finished goods. As explained in the Background, a single assembly line may produce different finished goods. Or, in certain cases, the same finished good may employ various permutations and combinations of workpiece elements, or other interchangeable parts.

Each workpiece employs a fixture. The fixture allows the workpiece to be mounted, so that the operations associated with the workpiece (i.e. affixing the workpiece in a manner to be integrated into the finished good), may be accomplished.

In the situation where the assembly line performs a variety of tasks, the numbers and types of workpieces may vary. Further, every time a workpiece is brought to a station, the workpiece being used may necessitate a manual determination to choose an appropriate fixture. Each workpiece may have different shapes, screw attachments, and the like. Thus, each workpiece may have a specific fixture to aid and facilitate in the mounting of the workpiece.

Due to the manual determination of the fixture, and the time necessary to replace the fixture, inefficiency is lost in the assembly line. Every time a new workpiece is placed in a station, a person or operator needs view the workpiece, lookup a corresponding fixture, and retrieve the fixture.

Disclosed herein are methods and systems for providing a flexible fixture, a flexible fixture, and various ways to automate an assembly line. Employing the aspects disclosed herein, an assembly line to produce finished goods may robustly handle multiple finished goods with different workpiece types. The flexible fixtures disclosed herein allow for a variety of workpiece types to be included in the same assembly line. Further, due to the automated nature of the methods discussed herein, gains in efficiency and resource reduction are achieved.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, a solid-state memory device, or other storage device 108 implementations known to one of ordinary skill in the art. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
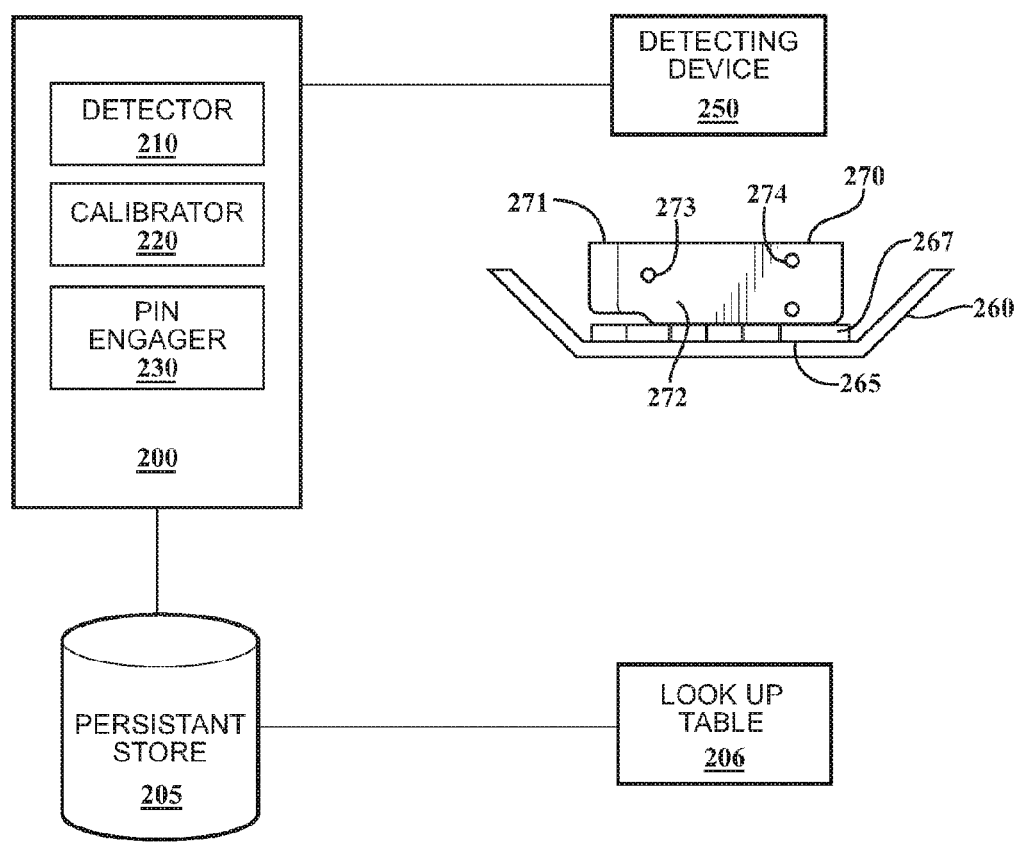
FIG. 2 illustrates an example of a system for providing and controlling a flexible fixture.

FIG. 2 illustrates an example of a system 200 for providing and controlling a flexible fixture 265. The system 200 may be implemented on a device or a processor, such as those enumerated above with regards to computer 100. The system 200 includes a detector 210, a calibrator 220, and an adjustable component 230, e.g., a pin engager.

The flexible fixture 265 is implemented on a tray 260. The tray 260 may be implemented in an assembly line (not shown in FIG. 2). An example of a flexible fixture 265 will be described in greater detail below.

The system 200 shown in FIG. 2 may be implemented on an assembly line. The assembly line may include the tray 260 in order to aid and support a workpiece 270 from being transported from one station of an assembly line to another. The tray 260 may be disposed on a mechanism for providing movement, such as a rail or automated moving device like a conveyor or automatic guided vehicle.

One example of a workpiece 270 is shown as a housing 270. However, as explained above, the workpiece 270 may vary depending on the finished good to be made or produced. The workpiece shown has various contours (shown as layers 271 and 272), and holes (shown as holes 273 and 274).

The detector 210 interfaces with a detection device 250. The detection device 250 may be any sort of device employed to detect the workpiece 270 placed onto the tray 260. Several examples of detection devices 250 are image capturing devices, radio frequency identification, weight detection, infrared sensors, and the like. The detection device 250 aids the detector 210 in identifying the workpiece 270 placed on the tray 260 and identifying the orientation of the workpiece 270 relative to the tray 260.

The system 200 may cross-reference a persistent store 205 (i.e. any of the storage devices enumerated above with regards to storage device 108), and a lookup table 206. Accordingly, data may be retrieved as to the type of workpiece 270 presently positioned on the assembly line, an acceptable orientation and location of the workpiece 270, and operation steps that should be performed by the flexible fixture 265.

Once the workpiece 270 is detected, the calibrator 220 may aid in the calibration of the workpiece 270. The workpiece 270 may be dis-oriented and not in a proper or a predefined location for the flexible fixture 265 to operate properly.

Accordingly, the calibrator 220 (after receiving an acceptable orientation and location of the workpiece 270), may instigate an operation to re-calibrate the workpiece 270. In one example, the calibrator 220 may vibrate the tray 260. In another example, the calibrator 220 may instigate a robotic arm or machine to move the workpiece 270 in the desired orientation. Alternatively, calibrator 220 may instigate the adjustable component 230 of the flexible fixture 265 to calibrate the workpiece 270.

In an example, the calibrator 220 may provide instructions for operating the adjustable component 230 of the flexible fixture 265. More specifically, the calibrator 220 instructs the adjustable component 230 of the flexible fixture 265 to engage the workpiece 270 so as to provide a fixture in a manner configurable to the specific or sensed workpiece 270 placed on the tray 260. Thus, when the adjustable component 230 is set into position, the flexible fixture 265 may lock the workpiece 270 in place, and thus, allow the workpiece 270 to be operable and attachable to other elements of the finished good.

FIGS. 3A and 3B illustrate an example of a flexible fixture 265. The flexible fixture 265 may be implemented with the system 200 shown above. The flexible fixture 265 is shown with a workpiece 270 situated on a tray 260. The flexible fixture 265 may include a base 267 and an adjustable component 230, wherein the adjustable component 230 is moveable relative to the base 267.

Referring to FIG. 3A, the flexible fixture 265 is in a non-engaged orientation. In FIG. 3A, a detection device 250 (shown as a camera), captures an image of the workpiece 270. Employing the aspects disclosed herein, the image of the workpiece 270 undergoes an image processing technique to identify the specific workpiece 270 shown, as well as a first orientation of the workpiece 270 relative to the flexible fixture 265. Various other aspects of the workpiece's 270 placement may also be detected, such as an angle, orientation, yaw, whether it is placed via the predetermined right side up.

In FIG. 3B, the flexible fixture 265 is in a state of engagement. The adjustable component 230, which is comprised of pins 301, 302, 303, and 304, is engaged such that the pins 301-304 engage the workpiece 270. As shown, the pins 301-304 are capable of being linearly moved up the direction 330 shown and down in an opposite direction. The number of pins 301-304 placed in a flexible fixture 265 may be chosen by an implementer. Further, the pins 301-304could be disposed in other locations on the flexible fixture 265 and could extend in other directions. Moreover, it should also be appreciated that the movement of the pins 301-304 may be provided by any suitable actuator that may be in electrical communication with the computer system 100.

Figure 3C:
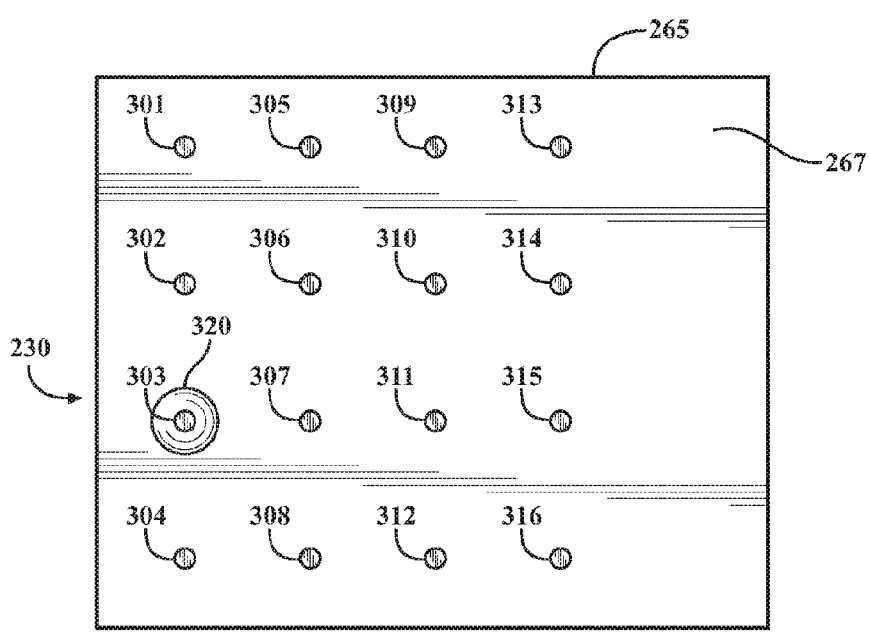

FIGS. 3A and 3B show a cross-sectional view of the flexible fixture 265. In a top-view of the flexible fixture 265 (shown in FIG. 3C), the pins 301-304 are shown extending from the base 267 with pin 305-316 in a planar fashion. In such a configuration, the pins 301-316 may be linearly moveable along various lengths relative to the base 267.

Also shown in FIGS. 3B and 3C is a suction cup 320. The suction cup 320 may be attached selectively on various pins 301-316 (such as the one shown on 303). The suction cup 320 engages the surface of the workpiece 270, and employs a technique to hold the workpiece 270 in place (employing suction forces). The number and placement of the various suction cups 320 on a flexible fixture 265 may be staggered in a predetermined manner, thus allowing various pins 301-316 to be used for a suctioning purpose.

The various pins 301-316 are engaged to various degrees, and for at least several different reasons. One reason is to engage holes that the workpiece 270 may have. In another example, the pins 301-316 may be employed to ensure that the workpiece 270 is in the proper orientation (for example, as shown in FIG. 3B, several of the pins 301-304 are employed to ensure the workpiece 270 is in a specific angle).

In an embodiment of a flexible fixture 265 shown in FIGS. 4A and 4B, the adjustable component 230 may include one or more inflatable bladders 271 that may have various shapes and may be disposed in various three-dimensional locations relative to the base 267 and tray 260. The inflatable bladders 271 are fluidly connected to a fluid source 273, e.g., an air or liquid source, that is configured to selectively fill the bladders 271 with the fluid. Further, the bladders 271 may include one or more outlets 275 for selectively emptying the fluid from the bladders 271. During operation, the bladders 271 may be selectively filled (as illustrated in FIG. 3B) and emptied (as illustrated in FIG. 3A) to various levels to engage specific areas of the workpiece 270 based on the type and orientation of the workpiece 270 currently positioned on the assembly line. Similar to the aforementioned pins 301-316, filling and emptying the bladders 271 allows the orientation of the workpiece 270 to be adjusted, and the bladders 271 may also fix the workpiece 270 in place such that the workpiece 270 does not move during a subsequent operation. It should be appreciated that the bladders 271 may be electrically connected to the calibrator 220 and other components of the computer system 100 to control inflation and emptying of the bladders 271.

Figure 6:
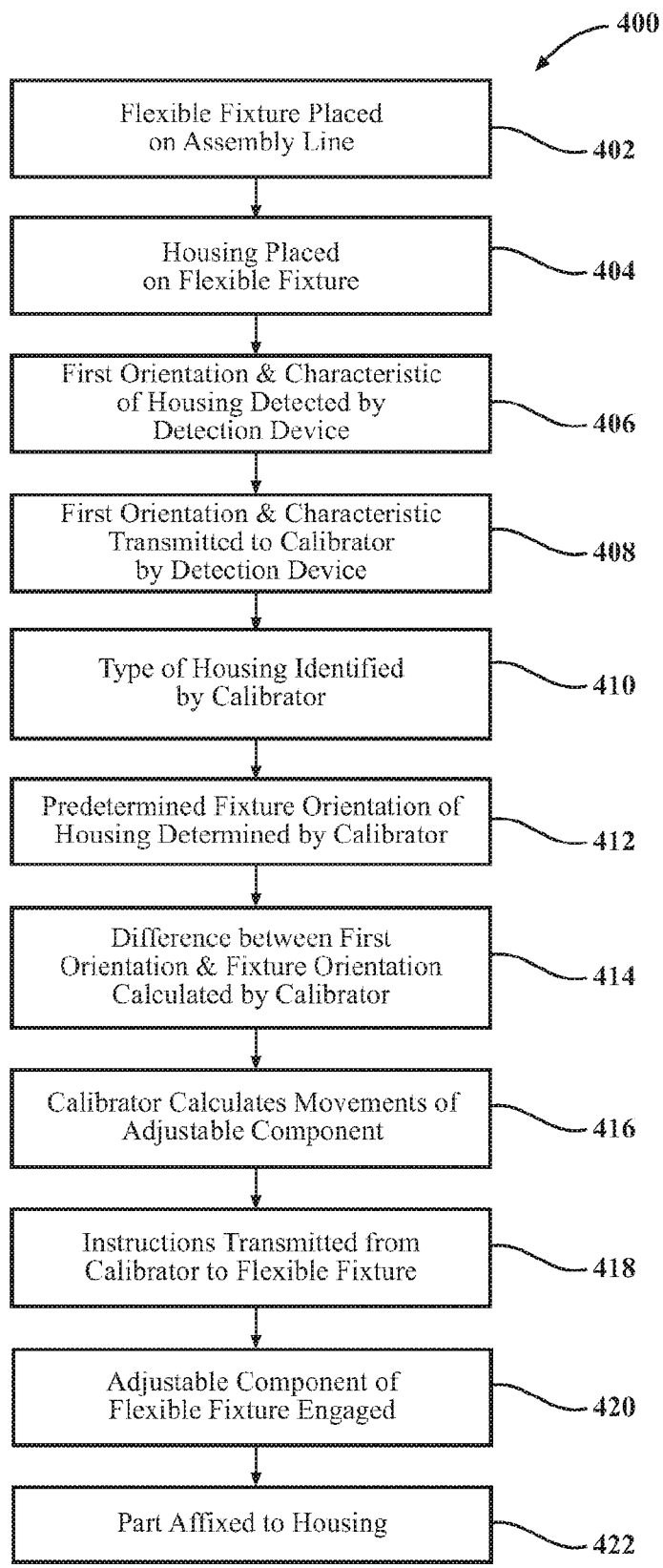
FIG. 6 illustrates an example of a method 400 for orienting a work piece on an assembly line to prepare the workpiece for an operation.

FIG. 6 illustrates an example of a method 400 for providing flexible a flexible fixture 265. The method 400 may be implemented on a conveyor system 450 shown in FIG. 5. The conveyor system 450 employs a tray 260 (or pallet) that is moveable along a rail.

In operation 402, the flexible fixture 265 is placed on the assembly line. More specifically, the flexible fixture 265 may be placed on a tray 260, which may be positioned on a conveyor (or other moving device) of the assembly line, such that the flexible fixture 265 may move with the conveyor. In operation 404, a workpiece 270 is placed onto the flexible fixture 265. The workpiece 270 may be placed in a manner through another manufacturing process, such an automatic loading system or the like.

In operation 406, a first orientation of the workpiece 270 relative to the flexible fixture 265 is determined by the detection device 210. Detecting the first orientation may include identifying at least one first angle between the workpiece 270 and at least one location of the flexible fixture 265 and/or tray 260, as well as at least one three-dimensional coordinate of one or more segments of the workpiece 270 relative to the flexible fixture 265 and/or tray 260. The one or more angles detected may be defined along pitch, yaw and tilt axes to provide a three-dimensional position of the workpiece 270. It should be appreciated that in the embodiment in which the detection device 210 is an image capturing device, the first orientation and three-dimensional coordinates may be determined based on images gathered by the image gathering device, either in real-time or after the images have been acquired.

In addition to detecting the first orientation of the workpiece 270, the detection device 210 detects another characteristic of the workpiece 270, e.g., size, weight or shape. In operation 408, the first orientation and the detected characteristic of the workpiece 270 are transmitted to the calibrator 220 by the detection device 210.

In operation 410, the type of workpiece 270 is identified by the calibrator 220 based on the detected characteristic of the workpiece 270. More specifically, the calibrator 220 may analyze information provided by the detection device 210 to establish what kind of workpiece 270 is positioned on the assembly line, e.g., it may detect what model the part is, whether it is a right hand part or left hand part, etc. It should be appreciated that identifying the type of workpiece 270 may include cross-referencing the detected characteristic with a persistent store 205 and lookup table 206.

In operation 412, a predetermined fixture orientation of the workpiece 270 is determined by the calibrator 220 based on the identified type of workpiece 270. More specifically, the fixture orientation may be an ideal orientation and location that the workpiece 270 should be positioned at relative to the flexible fixture and/or tray such that the workpiece 270 may undergo a subsequent operation. The method may recall a computer aided design (CAD) correlated to the exact workpiece 270 sensed and its relative position on the tray 260 from the persistent store 205 and lookup table 206.

In operation 414, a difference between the detected first orientation of the workpiece 270 and the fixture orientation is calculated by the calibrator 220. More specifically, this operation may include determining a difference between the at least one identified first angle and at least one fixture angle that is defined between the workpiece 270 and the at least one location of the workpiece 270 when the workpiece 270 is positioned in the fixture orientation. Additionally, this operation may include determining a difference between one or more three-dimensional coordinates of one or more segments of the workpiece 270 when the workpiece 270 is positioned in the first position relative to when the workpiece 270 is positioned in the fixture position. As such, the system detects the first orientation of the workpiece 270, and compares it to the fixture orientation to determine how they are different from one another.

In operation 416, the calibrator calculates movements of the adjustable component 230 that will move the workpiece 270 from the first orientation to the fixture orientation based on the calculated difference between the first orientation and the fixture orientation. Said another way, the system determines what kinds of movements of the adjustable component 230 of the flexible fixture 265 are necessary to orient the workpiece 270 in the fixture position.

In operation 418, instructions are transmitted from the calibrator 220 to the flexible fixture 265 to move the workpiece 270 from the first orientation to the fixture orientation by way of the adjustable component 230. In operation 420, the adjustable component 230 of the flexible fixture 265 is engaged to move the workpiece 270 from the first orientation to the fixture orientation. More specifically, the flexible fixture 265 may extend out the pins 301-316 in the manner described in FIGS. 3B and 3C, based on the specific workpiece 270, and its location on the tray 260. It should be appreciated that alternatively, the bladders 371 described in FIGS. 4A and 4C could be inflated/emptied to a predetermined level to similarly adjust and fix the workpiece 270 into the fixture orientation.

In another example, the suction cups 320 shown in FIGS. 3B and 3C may also be engaged. The location of the suction cups 320 engaged may be selectively chosen based on the sensed workpiece 270. The suction cups 320 may be employed to hold the workpiece 270 in place. Additionally, one or more of the pins 301-316 may be received in holes defined by the workpiece 270 to further hold the workpiece 270 in place.

In operation 422, a robotic arm may be employed to affix a part that is to be attached to the workpiece 270. It should be appreciated that the subject flexible fixture 265 holds the workpiece 270 in the desired fixture orientation during this operation. In one example, the robotic arm may be configured to apply a specific amount of pressure, thereby further ensuring that the flexible fixture 265 maintains integrity during the affixing process. Alternatively, a manual operation be performed by an operator may be performed as well.

Although not shown in the Figures, in certain implementations, the workpiece 270 may be calibrated and oriented in a manner to facilitate with the engagement of the flexible fixture 265.

Thus, employing the aspects disclosed herein, a single element may be employed to fixture a variety of workpiece structures. Further, because the systems and methods disclosed herein interface with CAD elements, the process may be automated. Thus, an assembly line may be implemented in a more efficient and cost-effective manner.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for orienting a workpiece on an assembly line to prepare the workpiece for an operation, said method comprising:
   positioning a flexible fixture on the assembly line, wherein the flexible fixture has a base and at least one adjustable component being moveable relative to the base;
   positioning a workpiece on the flexible fixture;
   detecting a first orientation of the workpiece relative to the flexible fixture with a detection device and transmitting the detected first orientation from the detection device to a calibrator;
   determining a difference between the detected first orientation of the workpiece and a predetermined fixture orientation with the calibrator and transmitting instructions from the calibrator to the flexible fixture to move the workpiece from the detected first orientation to the predetermined fixture orientation with the at least one adjustable component of the flexible fixture based on the determined difference; and
   moving the workpiece with the at least one adjustable component from the detected first orientation to the predetermined fixture orientation and fixedly holding the workpiece in the predetermined fixture orientation with the adjustable component;

wherein the detection device is an image capturing device, and wherein detecting the first orientation of the workpiece includes recording at least one image of the workpiece and the flexible fixture with the image capturing device;

wherein detecting the first orientation of the workpiece further includes identifying at least one first angle between the workpiece and the base of the flexible fixture when the workpiece is positioned in the first position, and wherein determining a difference between the detected first orientation of the workpiece and the predetermined fixture orientation includes determining a difference between the at least one identified first angle and at least one fixture angle defined between the workpiece and the base when the workpiece is positioned in the fixture orientation; and further including calculating movements of the at least one adjustable component of the flexible fixture with the calibrator that will position the workpiece in the predetermined fixture orientation based on the determined differences between the orientation and location of the workpiece in the first orientation and the fixture orientation.

2. A method as set forth in claim 1 wherein the at least one adjustable component of the flexible fixture includes an array of pins distributed across the base, and wherein each of the pins of the array are linearly moveable relative to the base.

3. A method as set forth in claim 2 wherein moving the workpiece with the adjustable component into the predetermined fixture orientation includes moving a plurality of the pins relative to the base along a predetermined length and against the workpiece.

4. A method as set forth in claim 3 wherein a suction cup is coupled with at least one of the pins, and wherein holding the workpiece in the predetermined fixture orientation includes engaging the workpiece with the at least one suction cup and positioning at least one of the pins of the flexible fixture into a hole defined by the workpiece.

5. A method as set forth in claim 1 wherein a tray is positioned on the assembly line such that the tray is moveable along the assembly line, and wherein the flexible fixture is disposed on the tray.

6. A method as set forth in claim 1 further including detecting a characteristic of the workpiece with the detection device; transmitting the detected characteristic from the detection device to the calibrator; and identifying the type of workpiece with the calibrator based on the detected characteristic of the workpiece.

7. A method as set forth in claim 6 wherein the detected characteristic of the workpiece is at least one of size, weight, and shape of the workpiece.

8. A method as set forth in claim 7 wherein identifying the type of workpiece with the calibrator includes cross-referencing the detected characteristic of the workpiece with a persistent store and a lookup table with the calibrator.

9. A method for orienting a workpiece on an assembly line to prepare the workpiece for an operation, said method comprising:

positioning a flexible fixture on the assembly line, wherein the flexible fixture has a base and at least one adjustable component being moveable relative to the base;

positioning a workpiece on the flexible fixture;

detecting a first orientation of the workpiece relative to the flexible fixture with a detection device and transmitting the detected first orientation from the detection device to a calibrator;

determining a difference between the detected first orientation of the workpiece and a predetermined fixture orientation with the calibrator and transmitting instructions from the calibrator to the flexible fixture to move the workpiece from the detected first orientation to the predetermined fixture orientation with the at least one adjustable component of the flexible fixture based on the determined difference; and moving the workpiece with the at least one adjustable component from the detected first orientation to the predetermined fixture orientation and fixedly holding the workpiece in the predetermined fixture orientation with the adjustable component;

detecting a characteristic of the workpiece with the detection device;

transmitting the detected characteristic from the detection device to the calibrator; and identifying the type of workpiece with the calibrator based on the detected characteristic of the workpiece.

10. A method as set forth in claim 9 wherein the detected characteristic of the workpiece is at least one of size, weight, and shape of the workpiece.

11. A method as set forth in claim 9 wherein identifying the type of workpiece with the calibrator includes cross-referencing the detected characteristic of the workpiece with a persistent store and a lookup table with the calibrator.

12. A method as set forth in claim 11 further including determining the predetermined fixture orientation of the workpiece with the calibrator based on the identified type of workpiece.

13. A system for orienting a workpiece on an assembly line to prepare the workpiece for an operation, said system comprising:

a flexible fixture having at least one base and at least one adjustable component being moveable relative to said base for being disposed on the assembly line and for supporting the workpiece as the flexible fixture moves along the assembly line;

a detection device configured to detect a first orientation of the workpiece relative to said flexible fixture, and configured to detect a characteristic of the workpiece; and a calibrator electrically connected to said flexible fixture and said detection device and configured to identify a type of workpiece based on said detected characteristic of the work piece detected by said detection device, configured to determine a predetermined fixture orientation based on said identified type of work piece, and configured to transmit instructions to said flexible fixture to move the workpiece from said detected first orientation to said predetermined fixture orientation with said at least one adjustable component of said flexible fixture and to hold the workpiece in said predetermined fixture orientation with said adjustable component.

14. A system as set forth in claim 13 wherein said at least one adjustable component includes an array of pins distributed across said base and linearly moveable relative to said base.

15. A system as set forth in claim 14 wherein a suction cup is coupled with at least one of said pins for engaging the workpiece to hold the workpiece in said fixture orientation.

16. A system as set forth in claim 13 wherein said detection device is an image capturing device.

17. A system as set forth in claim 13 wherein said at least one adjustable component includes at least one bladder connected to said base for being selectively filled to engage the workpiece to hold the workpiece in said fixture orientation.

18. A system as set forth in claim 17 wherein the said at least one inflatable bladder is fluidly connected to a fluid source for selectively filling said at least one inflatable bladder.

19. A system as set forth in claim 17 wherein said at least one bladder includes a plurality of bladders positioned at different locations of said base for engaging different parts of the workpiece while being filled.

20. A system as set forth in claim 17 wherein said at least one bladder includes at least one outlet for selectively emptying fluid from said at least one bladder.

* * * * *